(12) United States Patent
Buysse et al.

(10) Patent No.: US 6,732,791 B2
(45) Date of Patent: May 11, 2004

(54) HYDRAULIC OIL COOLER AND SUPPLYING VESSEL PRESSURE STABILIZER

(75) Inventors: John Buysse, St. Paul, MN (US); Rick Story, Jacksonville, FL (US)

(73) Assignee: STAC, Inc., St. Paul, MN (US)

( * ) Notice: Subject to any disclaimer, the term of this patent is extended or adjusted under 35 U.S.C. 154(b) by 0 days.

(21) Appl. No.: 09/747,431

(22) Filed: Dec. 22, 2000

(65) Prior Publication Data

US 2001/0050167 A1 Dec. 13, 2001

Related U.S. Application Data

(60) Provisional application No. 60/174,138, filed on Dec. 31, 1999.

(51) Int. Cl.[7] .................. G05D 16/00; G05D 23/00; F17C 13/00; F17C 13/02
(52) U.S. Cl. .................. 165/279; 165/287; 62/49.1; 137/267; 137/340
(58) Field of Search .................. 165/202, 279, 165/42, 287; 123/3, 258; 237/12.1; 62/45.1, 50.1, 53.2, 49.1; 141/82; 137/340, 267, 1

(56) References Cited

U.S. PATENT DOCUMENTS

| | | | |
|---|---|---|---|
| 2,374,639 A | * | 4/1945 | Miller .................. 165/279 X |
| 2,401,861 A | * | 6/1946 | Cunningham .......... 165/279 X |
| 2,453,766 A | | 11/1948 | Thayer |
| 2,502,184 A | | 3/1950 | Thayer |
| 2,798,365 A | | 7/1957 | Hesson |
| 3,110,156 A | | 11/1963 | Niemann |
| 3,202,209 A | * | 8/1965 | Otto et al. .................. 165/279 |
| 3,608,818 A | * | 9/1971 | Von Fellenberg ........ 165/279 X |
| 3,797,562 A | * | 3/1974 | Brille et al. .................. 165/279 |
| 3,880,229 A | * | 4/1975 | Caldwell .................. 165/279 X |
| RE29,463 E | | 11/1977 | Bognaes et al. |
| 4,177,017 A | | 12/1979 | Schultz |
| 4,312,372 A | | 1/1982 | Amos et al. |
| 4,371,112 A | * | 2/1983 | Tholen |
| 4,424,776 A | * | 1/1984 | Allen |
| 4,463,897 A | * | 8/1984 | Denneny, Jr. et al. .. 165/279 X |
| 4,593,763 A | * | 6/1986 | Burke |
| 4,911,330 A | | 3/1990 | Vlaanderen et al. |
| 4,964,459 A | | 10/1990 | Stenlund |
| 5,098,036 A | * | 3/1992 | Brigham et al. ........ 165/279 X |
| 5,222,875 A | | 6/1993 | Clark |
| 5,243,821 A | | 9/1993 | Schuck et al. |
| 5,317,872 A | * | 6/1994 | Ingvast |
| 5,323,833 A | | 6/1994 | Kirkmyer |
| 5,360,139 A | | 11/1994 | Goode |
| 5,505,232 A | | 4/1996 | Barclay |
| 5,533,333 A | * | 7/1996 | Pullar et al. |
| 5,630,625 A | | 5/1997 | Shaw |
| 5,762,119 A | | 6/1998 | Platz et al. |

(List continued on next page.)

OTHER PUBLICATIONS

"Thermal Transfer Unit Parts List", Midwest Meter, 1 page, date unknown.
U.S. Provisional Patent Application No. 60/257,940, filed Dec. 21, 2000.

Primary Examiner—Ljiljana Ciric
(74) Attorney, Agent, or Firm—Dicke, Billig & Czaja, PLLC

(57) ABSTRACT

A fluid delivery system, for e.g. a vehicle, includes a tank for holding fluid product, such as propane, a pump for pumping the fluid product from the tank, the pump being driven by hydraulic fluid, and a heat exchanger for using the fluid product to cool the hydraulic fluid. The heat exchanger also causes the fluid product to increase in temperature. The heated fluid product is returned to the tank, in the form of a vapor, for example. Embodiments of the invention provide a number of advantages, including increased pump flow rates, reduced cavitation, increased pump life, and elimination of a heat-exchanger fan.

17 Claims, 9 Drawing Sheets

U.S. PATENT DOCUMENTS

| | | |
|---|---|---|
| 5,954,101 A | 9/1999 | Drube et al. |
| 5,970,732 A * | 10/1999 | Menin et al. |
| 6,086,002 A * | 7/2000 | Frazier et al. |
| 6,354,088 B1 | 3/2002 | Emmer et al. |
| 6,644,039 B2 * | 11/2003 | Hughes et al. ............... 62/49.1 |
| 2002/0083719 A1 | 7/2002 | Hughes et al. |

* cited by examiner

HYDRAULIC OIL COOLER AND SUPPLYING VESSEL PRESSURE STABILIZER

CROSS REFERENCE TO RELATED APPLICATION

The subject matter of this application is related to the subject matter of U.S. provisional patent application No. 60/174,138, filed Dec. 31, 1999, priority to which is claimed under 35 U.S.C. 119(e) and which is incorporated herein by reference.

BACKGROUND OF THE INVENTION

1. Field of the Invention

Embodiments of the invention relate to improvements in pumping fluids from tanks or other supplying vessels. Specific aspects of the invention, for example, relate to pumping propane from a vehicle, such as a bobtail or tank truck, with improvements in e.g. thermal characteristics and pump operation. Other examples will be described as well.

2. Description of Related Art

Liquefied compressed gases such as propane are generally transported via truck primarily in two different ways. The first way is via a transport. A transport is a trailer that holds approximately 7,000–10,000 gallons of liquid propane. The transport is used to fill outlying storage tanks and large industrial tanks. The second way is via a straight truck, which the propane industry typically calls a bobtail. The bobtail typically holds less than 3,500 gallons of liquid propane and is used to fill residential and small business propane tanks.

When a transport unloads, the operator generally will connect two hoses between the transport and the storage tank. The first hose connected is called the vapor hose and the second is called the discharge hose. The purpose for the vapor hose is to allow the vapor pressures between the transport and the storage tank to equalize and to allow vapor pressure to be pushed back into the transport vapor space while they are pumping. This equalizes the pressures and allows the liquid product pump to pump at a higher rate and lower pressures, which minimizes noise and internal damage to the propane pump.

When a bobtail unloads, the operator typically uses only a discharge hose. Most bobtails do not have a second vapor hose. Not having the vapor hose causes two things to happen. First, as the propane pump on the bobtail pumps liquid propane from the bobtail into the storage tank, the pressure in the storage tank continues to rise and causes back pressure on the discharge line. This back pressure causes the discharge line pressure to continue to rise, causing the pump to work harder and thus reducing the flow rate and increasing the wear of the propane pump. Second, as the propane pump pulls product out of the bobtail tank it creates a vacuum inside the bobtail tank. This vacuum creates bubbles in the propane which are then pulled through the propane pump. As these bubbles are pulled through the propane pump they compress and then expand rapidly, potentially causing damage to the internal vanes and rotor of the propane pump. These bubbles reduce the flow rate of the pump and create a higher level of pump noise.

Liquid products that do not change state as readily, such as fuel oil and refined fuel, are transported via truck primarily in two different ways. The first way is via a transport, described earlier. The second way is via a straight truck. The straight truck carries 500–5,000 gallons of product. The straight truck typically delivers to residential customers and to small industrial customers.

With liquid products that do not change state, both the transport and the straight truck unload in approximately the same way. The operator connects a single discharge hose between the transport or straight truck to the storage tank. Once this has been accomplished, the operator then starts the pump and pumps the liquid product into the storage tank. Since this type of liquid is not pressurized to maintain it as a liquid, the transport, straight truck and storage tanks can all be vented to atmosphere. This eliminates the need for a vapor hose.

Thus, the propane bobtail delivery market and the fuel-oil and refined-fuels tank-truck delivery market, for example, are similar in that typically they both use a tandem-axle-style truck with a multi-thousand gallon tank mounted on the chassis. These vehicles are used to deliver typically small quantities of e.g. propane, fuel oil, diesel fuel and gasoline to e.g. homes, farms and small businesses.

Currently, there is a movement in these industries to change from driveline-driven product pumps to hydraulic drives. This change is coming from a number of areas, e.g. safety, maintenance and a need to either mount the product pump in a location that cannot be easily driven by a driveshaft or a need for two or more product pumps on a truck. The tank-truck market is shifting towards having larger and multicompartment tanks on their trucks. This shift allows more efficient use of their trucks and their employees.

It would be desirable to take advantage of the movement to change from driveline-driven product pumps to hydraulic drives, to further capitalize on the attendant advantages. Additionally, a need exists to diminish the problems of back pressure and vacuum-induced bubbles in e.g. propane, which bubbles are then pulled through the propane pump. It would also be desirable to diminish the disadvantages caused by using a fan for cooling, e.g. noise, vibration/resonance, and maintenance/upkeep concerns.

SUMMARY OF THE INVENTION

To achieve the above and other goals, one embodiment of the invention uses the product that the customer is pumping, e.g. propane, to cool the hydraulic oil used to run the pump. A liquid-to-liquid heat exchanger receives the hydraulic oil line and a line containing the pumped product. Approximately two gpm of product can be pumped through the heat exchanger, according to one embodiment. The two liquids are separated by thin channels of e.g. stainless steel or another material. The heat exchanger cools the hydraulic oil and warms the customer's liquid product. Embodiments of the invention have particular advantages in e.g. the propane industry. Propane is heated, vaporized and then pumped back into the top of the supplying tank. This vaporized propane increases pump flow rates, reduces cavitation and increases pump life. These advantages are obtained, according to embodiments of the invention, with no fan motor, better product pump performance, longer product pump life, and smaller and lighter pump weights.

The theory behind embodiments of the invention is two-fold for e.g. propane types of application. First, by using the liquid propane as the cooling agent inside the liquid-to-liquid heat exchanger, the hydraulic oil is kept at a safe operating temperature without the use of a cooling fan. Second, as the hydraulic oil passes through the heat exchanger it heats the liquid propane.

The heated liquid propane is boiled or vaporized and then pumped back into the vapor space, or liquid space, in the bobtail tank. By reintroducing this vapor back into the bobtail tank, the problems that were stated above are minimized. Embodiments of the invention decrease the length of time during which product can be unloaded, stabilize the vapor pressure in the bobtail tank, reduce pump wear and noise, and cool the hydraulic system without the need for any type of cooling fan.

Embodiments of the invention for liquid products that do not as readily change state regulate a small amount of the liquid product being pumped through the heat exchanger. As the liquid passes through the heat exchanger, it cools the hydraulic oil. The heated liquid product is the reintroduced back into e.g. either the transport or straight truck tank or back into the discharge line of the pump.

Embodiments of the invention provide significant advantages, in that they can cool the hydraulic oil without the need for a cooling fan and can aid in the pumping of liquids that become more difficult to pump in colder climates.

Embodiments of the invention can be described as a combination of a hydraulic oil cooler and a supplying vessel pressure stabilizer. Embodiments of the invention can be used in applications that require hydraulic oil to be cooled while it is operating a product pump that is pumping some type of liquid product. The hydraulic oil is cooled via a "liquid-to-liquid" heat exchanger, for example. This heat exchanger can have up to at least three channels allowing up to at least three different liquids to pass through it at any one time.

On one side of the heat exchanger is the hydraulic oil and on the other side(s) are one or more liquid products that are being pumped by the product pump(s). The liquid products absorb the heat of the hydraulic oil. In effect, embodiments of the invention are cooling the hydraulic oil and heating the amount of liquid product that is being pumped through the heat exchanger. This device will work when the temperature of the liquid product being pumped is less than the maximum desired hydraulic oil temperature. Different types of liquids at different flow rates affect the cooling capacity of the heat exchanger and the amount of heat being transferred into the liquid product being pumped. Hydraulic oil flow rates at varying pressures affect the amount of heat (BTU's) that are produced.

At least two different types of liquid products can be used with this device. The first is a "non-state-changing" liquid, as referenced above. This type of liquid does not change its state when the amount of heat (BTU's) that a hydraulic system creates is dissipated and absorbed by the liquid. For example, embodiments of the invention simply add a fixed amount of BTU's to diesel fuel. These added BTU's increase the temperature of the diesel fuel to a predetermined and controlled safe temperature. The second type of liquid, the "state-changing" liquid, begins to boil or vaporize as its temperature is changed. These types of liquids are typically referred to as liquefied compressed gases. For example, propane will boil or vaporize as heat is introduced to it.

According to embodiments of the invention, the liquid product being pumped through the heat exchanger is reintroduced back into the supplying vessel once it has circulated through the heat exchanger. Depending upon the product, it will enter back into the supplying vessel as a warmed-up liquid or as a boiling liquid or vapor. This vapor can be extremely beneficial to certain types of supplying vessels to aid in the pumping process. This benefit will be described in detail, further into this description.

Embodiments of the invention contain a "liquid-to-liquid" heat exchanger, a hydraulic reservoir, and a hydraulic oil filter. These parts are manufactured and assembled into a package that is compact, light-weight and easy to install for the customer. Embodiments of the invention also diminish many of the problems referenced above, e.g. back pressure, vacuum-induced bubbles, cavitation, noise, vibration/resonance, maintenance/upkeep concerns, and the like.

Additional features and advantages according to embodiments of the invention will become apparent from the remainder of this patent application.

BRIEF DESCRIPTION OF THE DRAWINGS

Embodiments of the invention will be described with respect to the figures, in which like reference numerals denote like elements, and in which.

DETAILED DESCRIPTION OF PREFERRED EMBODIMENTS

Figure 1:
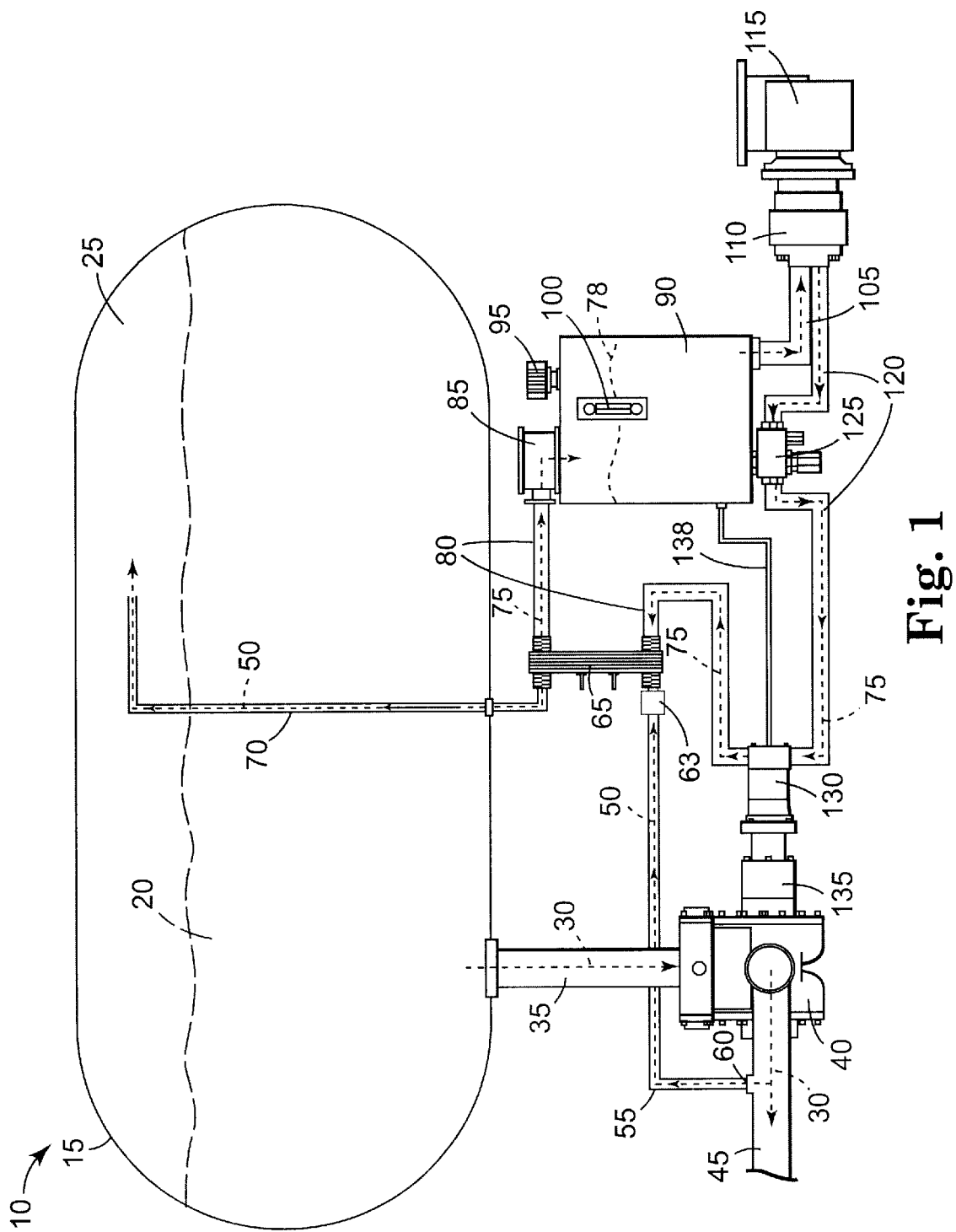
FIG. 1 is a schematic view of a cooler/stabilizer according to an embodiment of the invention.

Turning first to FIG. 1, fluid handling system 10 according to an embodiment of the invention includes supplying vessel or tank 15 for holding first fluid 20, e.g. propane, fuel oil, diesel fuel, gasoline, or other liquid. Both liquefied compressed gases and liquid products that do not change state as readily are contemplated for use as first fluid 20. Supplying vessel 15 also defines vapor space 25 disposed above first fluid 20.

Discharge flow path 30 is in fluid communication with supplying vessel 15. Discharge flow path 30 is disposed to receive first fluid 20 from supplying vessel 15 for discharge from supplying vessel 15 and, according to embodiments of the invention, from fluid handling system 10 to e.g. receiving tanks/vessels or the like external to system 10 at homes, farms, small business, etc. According to embodiments of the invention, discharge flow path 30 is defined, at least in part, by suction inlet port or pump inlet port 35, product pump 40 and pump outlet discharge line 45. Product pump 40 is a pumping mechanism that is constructed and disposed to move first fluid 20 along discharge flow path 30.

Return flow path 50 is in fluid communication with discharge flow path 30 and, ultimately, with supplying vessel 15. Return flow path 50 is disposed to receive first fluid 20 from discharge flow path 30 for return to supplying vessel 15. According to the illustrated embodiment, return flow path 50 is defined, at least in part, by product/coolant line 55, which intersects pump discharge line 45 at intersection point 60, heat exchanger 65, and liquid/vapor return line 70. Product/coolant line 55 is connected to heat exchanger 65 via flow control 63.

Fluid handling system 10 also comprises heat-exchange flow path 75, which is disposed to contain second fluid 78, which is e.g. hydraulic fluid or oil for actuating pump 40. Second fluid 78 is free of fluid communication with first fluid 20, according to embodiments of the invention.

According to the illustrated embodiment, heat-exchange flow path 75 is defined, at least in part, by hydraulic return line 80, which is connected via hydraulic filter 85 to hydraulic tank assembly 90. Hydraulic tank assembly 90 includes hydraulic breather 95 and site/level oil gauge 100, according to the illustrated embodiment. Hydraulic suction line 105 connects hydraulic tank assembly 90 to hydraulic pump 110, which is connected to power take-off (PTO) 115. Hydraulic pressure lines 120 and hydraulic flow and PSI block 125 connect hydraulic pump 110 to deliver second fluid 78 for actuating product pump 40 via hydraulic motor 130, which is mounted by hydraulic motor mounting assembly 135. Thus, pump 40 is in fluid communication with heat-exchange flow path 75.

Case drain line 138 connects hydraulic tank assembly 90 to hydraulic motor 130.

In operation, pump 40 is activated to move first fluid 20 along discharge flow path 30 for discharge from supplying vessel 15 and/or fluid handling system 10. First fluid 20 in discharge flow path 30 is in the form of a liquid at intersection point 60 according to embodiments of the invention, as is first fluid 20 in return flow path 50 at point 60.

The temperature of first fluid 20 in return flow path 50 is cooler upon entering heat exchanger 65 than second fluid 78 in heat-exchange flow path 75. In heat exchanger 65, thermal transfer occurs between first fluid 20 and second fluid 78. According to one embodiment, second fluid 78, e.g. hydraulic oil, is cooled by first fluid 20, e.g. propane, and first fluid 20 is heated by second fluid 78. Thus, heat exchanger 65 is constructed and disposed to cause a temperature change in both first fluid 20 and second fluid 78, and the temperature of first fluid 20 is generally less than the maximum desired temperature of second fluid 78.

In summary, fluid handling system 10, which can be disposed on a vehicle, such as a truck, comprises tank 15 for holding fluid product 20, pump 40 for pumping fluid product 20 from tank 15, pump 40 being driven by hydraulic fluid 78, and heat exchanger 65 for using fluid product 20 to cool hydraulic fluid 78. Fluid product 20 can be propane. Further, heat exchanger 65 heats propane or other first fluid 20 and causes it to vaporize. The vaporized propane in liquid/vapor return line 70 than is pumped and returned either to vapor space 25 or the liquid space of tank 15. In other words, heat exchanger 65 heats fluid product 20 and returns it to tank 15.

Three control blocks can be offered as options to the FIG. 1 embodiment, as will now be described with respect to FIGS. 2–7.

Figure 2:
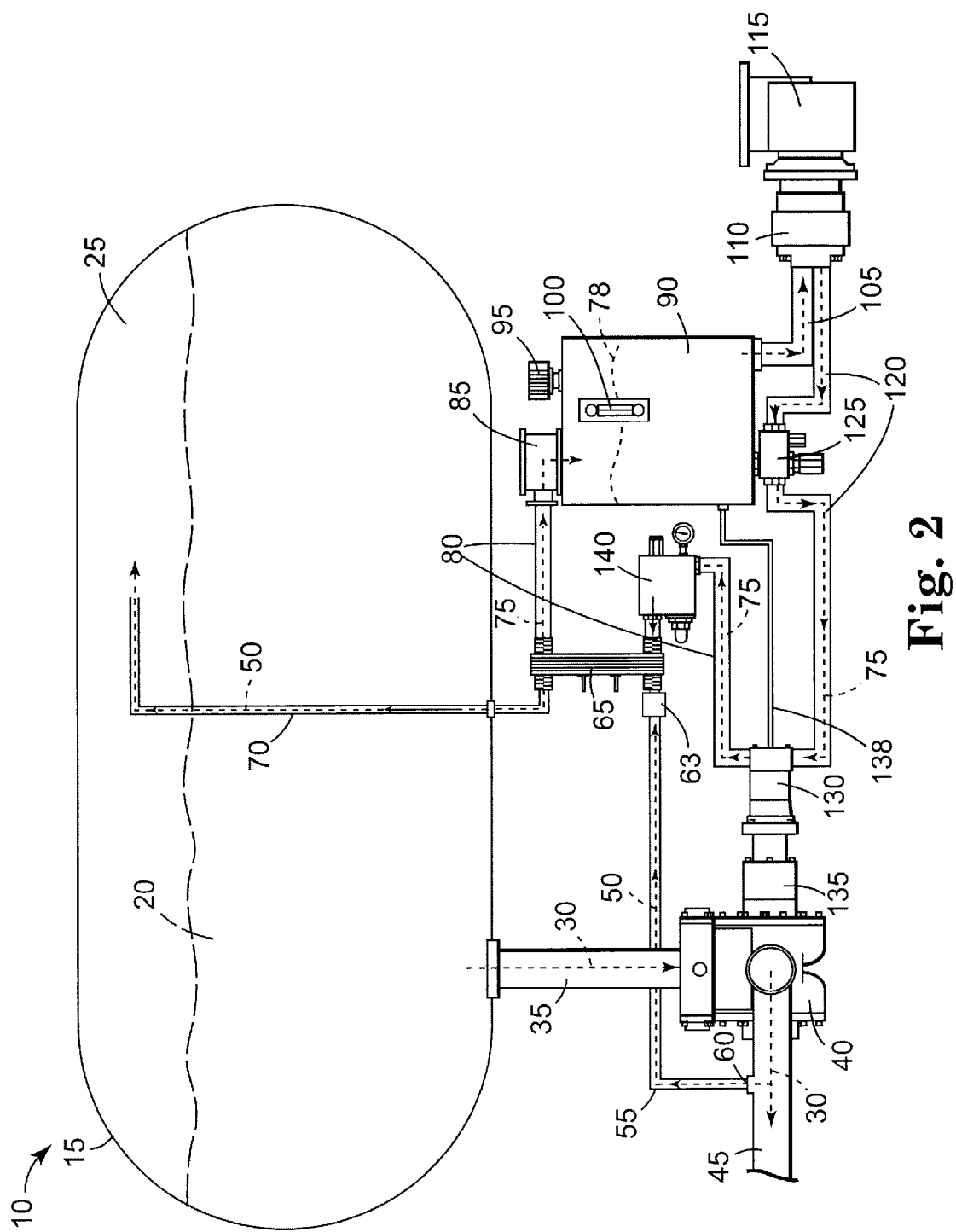
FIG. 2 is a schematic view of a cooler/stabilizer having a temperature-sensing, heat-generating control block according to an embodiment of the invention.
Figure 3:
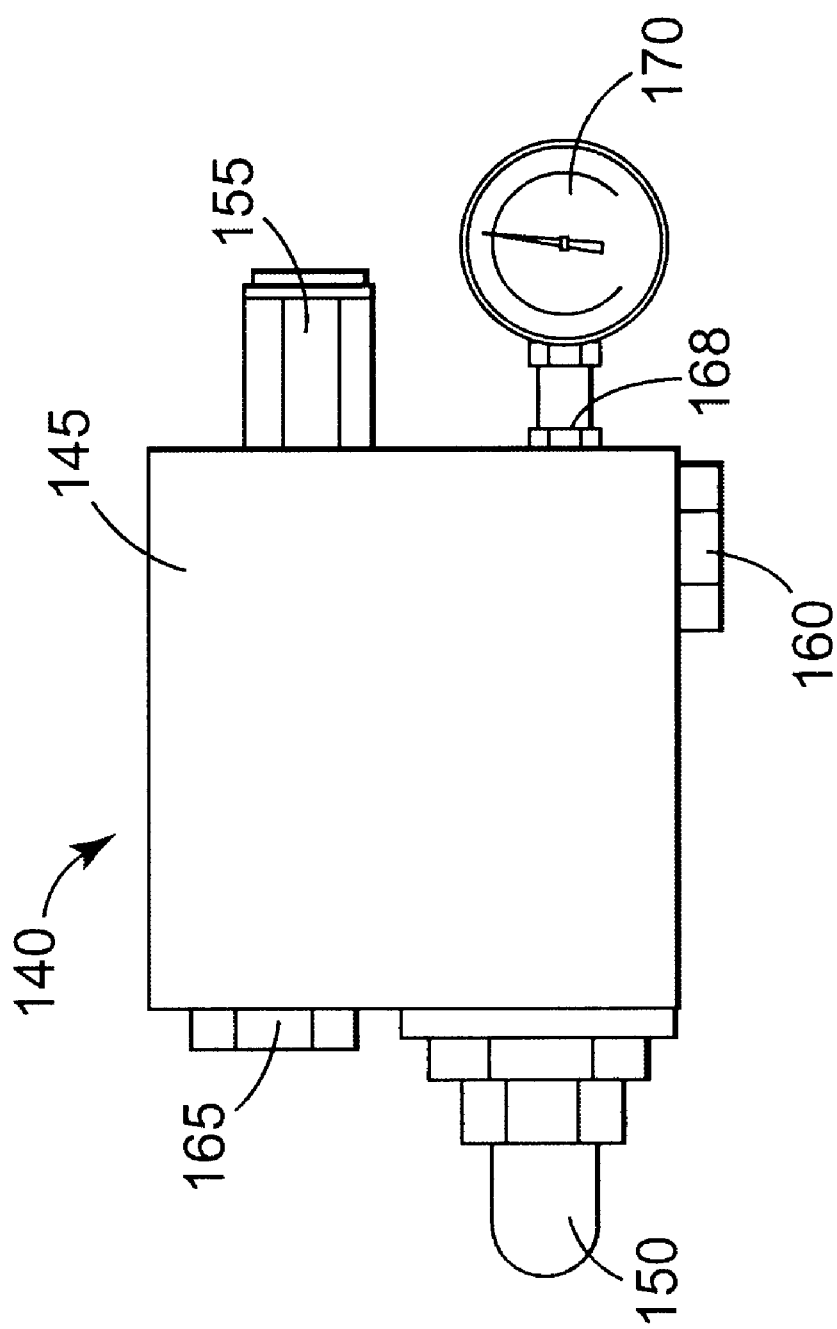
FIG. 3 is a detailed view of the temperature-sensing, heat-generating control block of FIG. 2.

The first of the three control blocks is temperature-sensing, heat-generating block 140, shown generally in FIG. 2 and in detail in FIG. 3. Block 140 is disposed in heat-exchange flow path 75, just before heat exchanger 65, in the illustrated embodiment. Block 140 includes valve body 145, temperature sensing cartridge 150, heat-generating cartridge 155, hydraulic oil inlet and outlet ports 160, 165, hydraulic oil pressure port 168, and hydraulic oil pressure gauge 170.

Block 140 senses the temperature of the hydraulic oil or other second fluid 78 by temperature sensing cartridge valve 150. It then will internally either route the e.g. hydraulic oil over hydraulic heat generating cartridge valve 155 and then into heat exchanger 65, or it will route the hydraulic oil directly to heat exchanger 65, bypassing hydraulic heat-generating cartridge valve 155. The temperature at which block 140 switches the routing from one to the other can be changed to meet the requirements for a particular environment or application.

Thus, temperature sensor 150 is in communication with heat-exchange flow path 75 for sensing the temperature of second fluid 78. Heat generator 155 is also in communication with heat-exchange flow path 75, and is constructed and disposed for heating second fluid 78 in response to an indication from temperature sensor 150.

Block 140 presents significant advantages. A cold outside air temperature or other ambient environment produces a colder tank and therefore less vapor pressure within the tank. In other words, the fluid product within the tank is more condensed. This cooler temperature causes pump 40 to draw a vacuum within tank 15 more quickly, potentially starting cavitation in pump 40 at an earlier time. Heating second fluid 78 causes increased thermal transfer to first fluid 20, increasing the reduced vapor pressure in tank 15 and tending to diminish the cavitation problem. Additionally, heated fluid 78 provides e.g. start-up advantages in fluid handling system 10.

Figure 4:
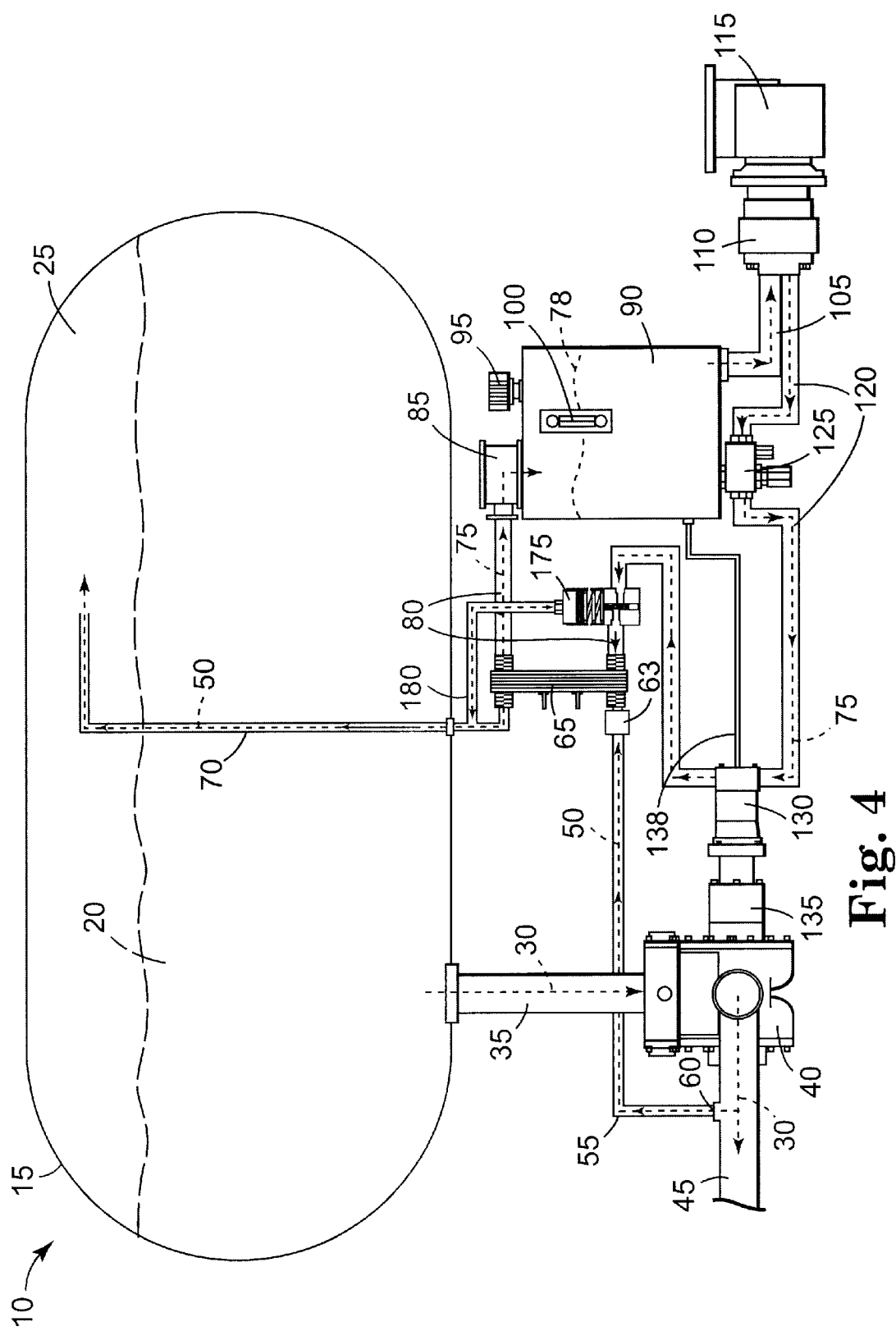
FIG. 4 is a schematic view of a cooler/stabilizer having a pressure-sensing, heat-generating control block according to an embodiment of the invention.
Figure 5:
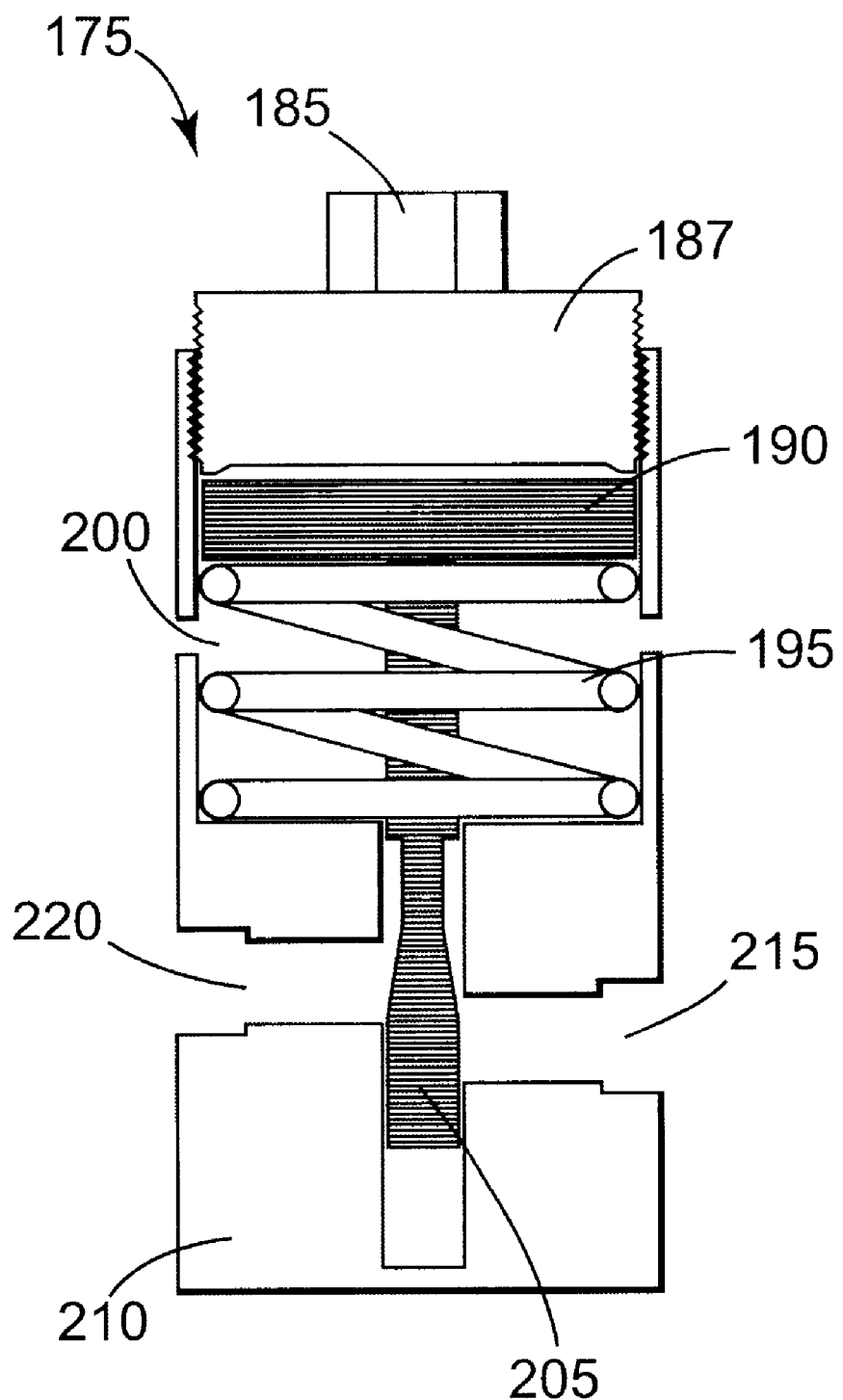
FIG. 5 is a detailed view of the pressure-sensing, heat-generating control block of FIG. 4.

The second unique, optional control block for fluid handling system 10 is pressure-sensing, heat-generating control block 175, shown in FIG. 4 in heat-exchange flow path 75 and shown in more detail in FIG. 5. Block 175 senses vapor pressure in supplying vessel 15 via sensing line 180 routed between vessel 15 and control block 175. Via product sensing port 185 and end cap 187, which includes a filter, the vapor pressure in supplying vessel 15 pushes on piston 190. Piston 190, in turn, moves against bias spring 195 disposed within piston chamber 200. This movement determines a pass-through orifice size, by moving orifice spool 205, anchored in spool block 210. Hydraulic oil or other second fluid 78 enters block 175 at inlet port 215, passes through the orifice whose size is determined in the manner described above, and then out through outlet port 220 enroute to heat exchanger 65. The size of the orifice determines the amount of hydraulic heat transferred in heat exchanger 65. The lower the product vapor pressure, the smaller the orifice size, which in turn equals a higher hydraulic oil temperature. The maximum pressure limitations of supplying vessel 15 will determine the maximum amount of hydraulic heat that can be generated through control block 175. Thus, control block 175 includes a pressure sensor constructed and disposed to indicate vapor pressure in supplying vessel 15, and a temperature regulator in communication with heat-exchange flow path 75, the heat generator being constructed and disposed for heating second fluid 78 in response to an indication from the pressure sensor. According to one embodiment, the pressure sensor and temperature regulator are disposed as an integral unit 175 in fluid communication with both return flow path 50 (via sensing line 180) and heat-exchange flow path 75.

Figure 6:
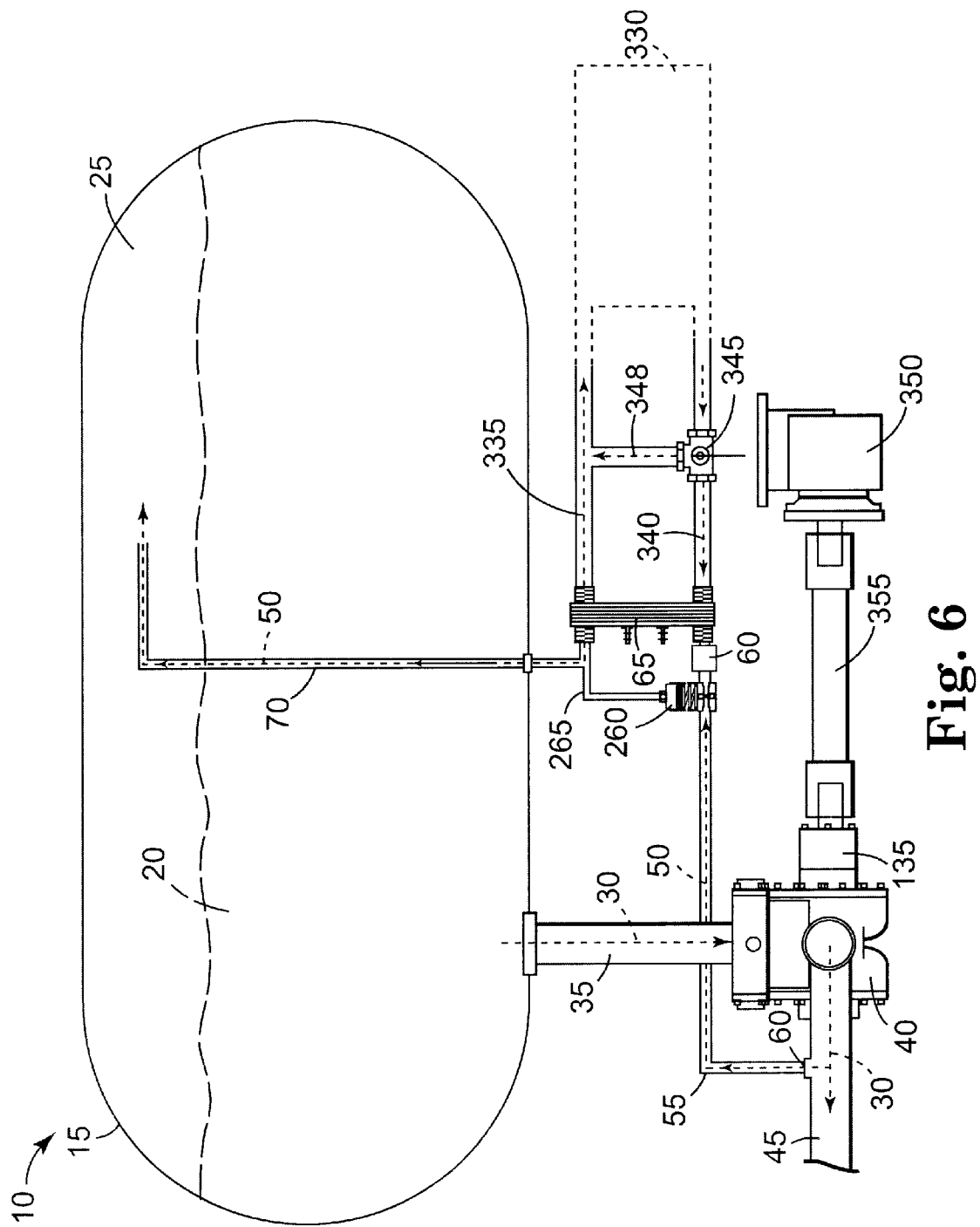
FIG. 6 is a schematic view of a cooler/stabilizer having a pressure-sensing, shut-off valve control block according to an embodiment of the invention.
Figure 7:
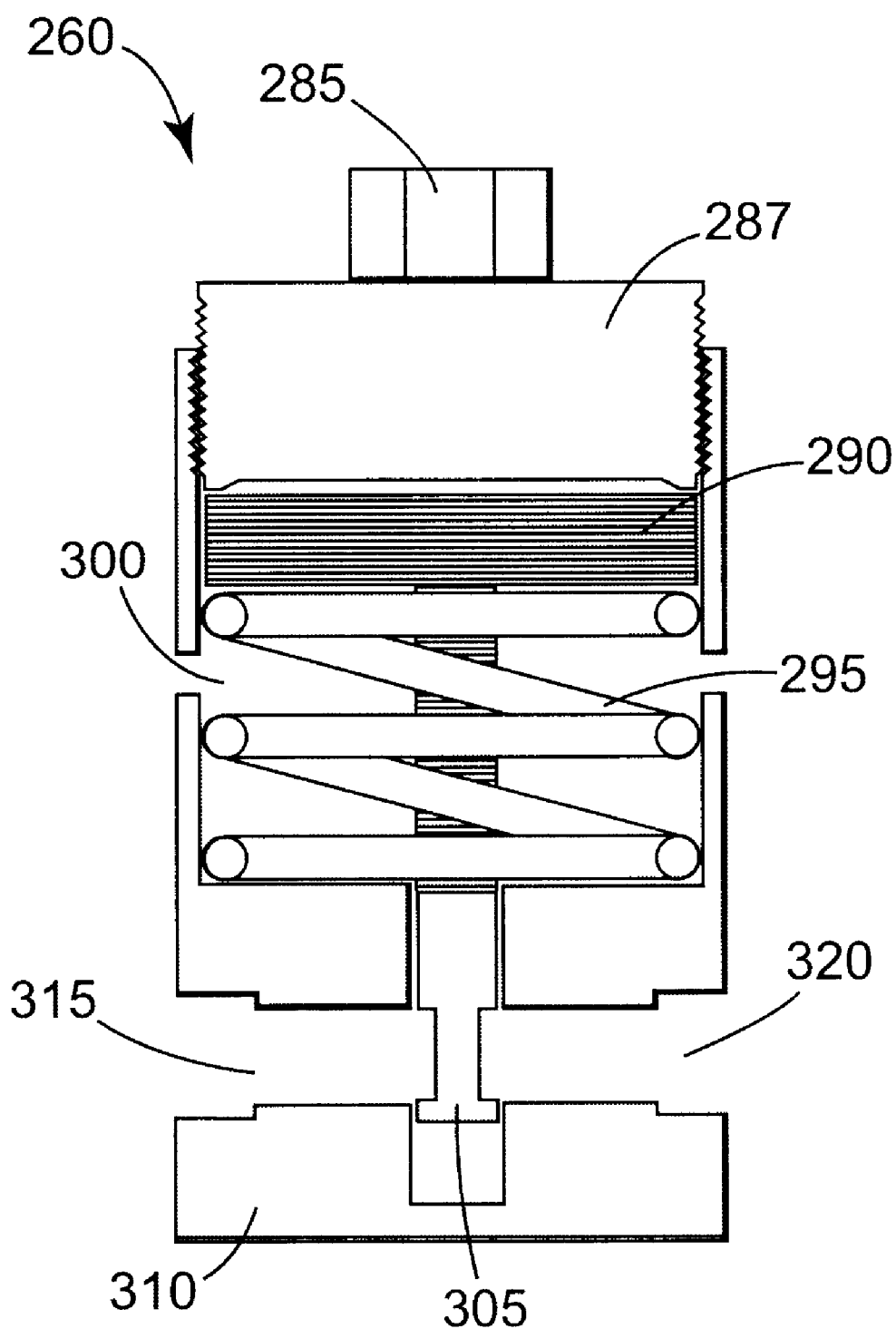
FIG. 7 is a detailed view of the pressure-sensing, shut-off valve control block of FIG. 6.

The third unique, optional control block is pressure-sensing, shut-off control block 260, illustrated in FIG. 6 in return flow path 50 and illustrated in more detail in FIG. 7. Block 260 is designed to mechanically shut off the flow of cooling liquid (e.g. first fluid) 20 if and when the pressure in supplying vessel 15 reaches a predetermined pressure. This shut-off protects supplying vessel 15 from over-pressurization.

Block 260 senses vapor pressure in supplying vessel 15 via sensing line 265, which is in fluid communication with return flow path 50 and thus is in fluid communication with supplying vessel 15. The vapor pressure in supplying vessel 15 pushes against piston 290, via product sensing port 285 and end cap 287 (which includes a filter). Piston 290 in turn moves against bias spring 295 disposed within piston chamber 300. This movement determines whether or not spool 305 moves within spool block 310 to a position that does or does not allow first fluid 20 (product/coolant) to flow from inlet port 315 to outlet port 320 and on to heat exchanger 65. Thus, according to this embodiment, fluid handling system 10 includes a pressure sensor constructed and disposed to indicate vapor pressure in supplying vessel 15, and a flow regulator in fluid communication with return flow path 50, the flow regulator being constructed and arranged to decrease flow of first fluid 20 in return flow path 50 in response to a high-pressure indication from the pressure sensor. The pressure sensor and flow regulator are disposed as an integral unit 260 in fluid communication with return flow path 50.

Returning to FIG. 6, according to this embodiment heat exchanger 65 is in fluid communication with engine 330 via engine coolant return lines 335, 340. Engine coolant bypass valve 345, preferably a ball valve, allows bypass of heat exchanger 65 via engine coolant bypass line 348 if desired. Power take-off 350 draws power off engine 330 for activating pump 40 via driveline 355. Thus, fluid handling system 10 according to this embodiment uses engine coolant as an equivalent to the previously described second fluid 78. Alternatively, hydraulic oil or other fluids can also be used in this embodiment in the manner described previously.

Figure 8:
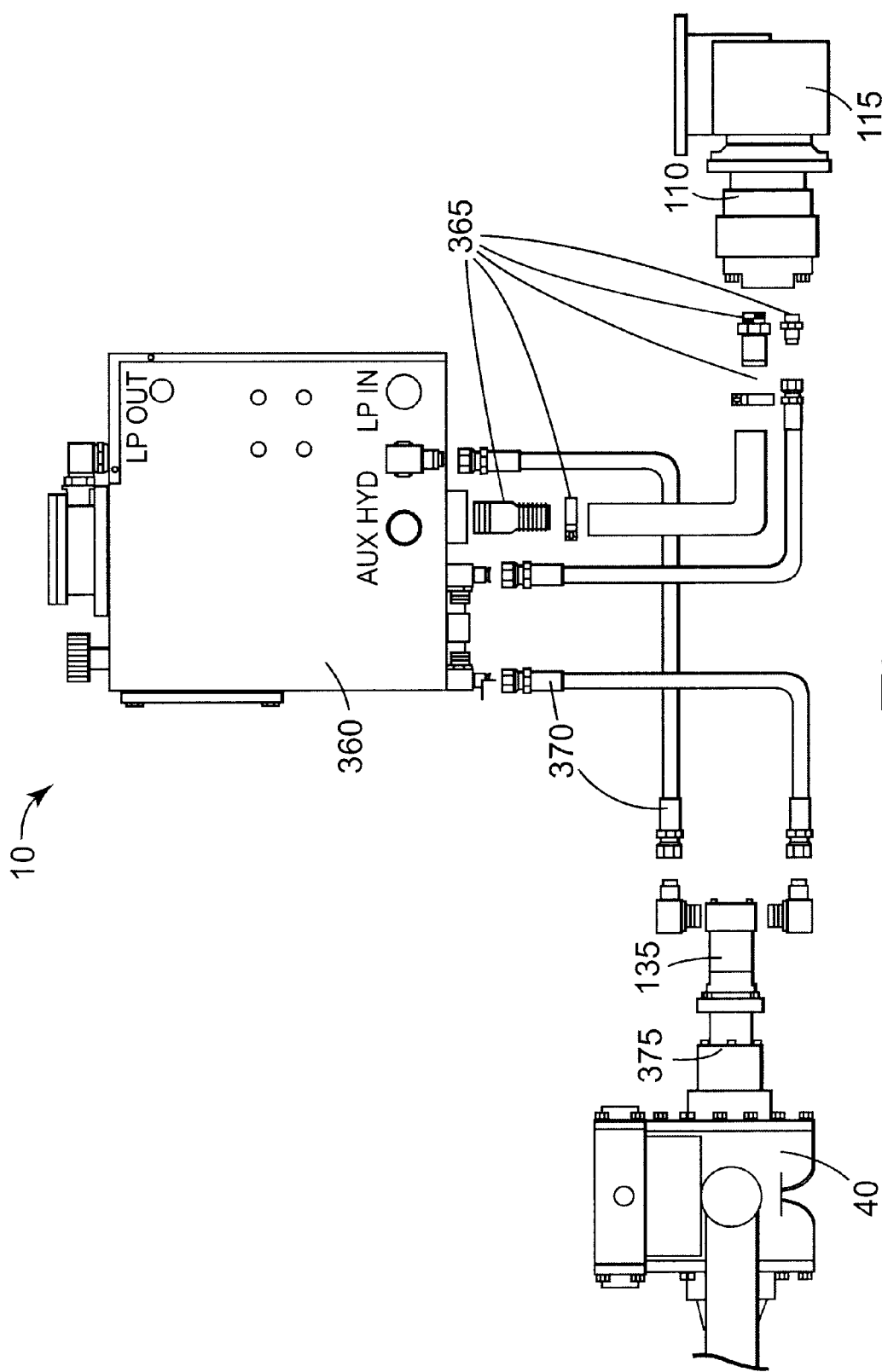
FIG. 8 is a schematic view showing a cooler/stabilizer according to an embodiment of the invention.

FIG. 8 shows additional aspects of fluid handling system 10, including system casing 360, fittings 365 for connection with pump 110, and fittings 370 for connection with hydraulic motor 135 and pump 40. Pump 110, according to this embodiment, can have a pump speed of 1,500 rpm, producing 16 gpm at 1,500 PSI. PTO 115 can accommodate 1,300 engine rpm, according to one embodiment. Hydraulic motor 135 optionally can be attached to pump 40 by hydraulic adapter 375, and pump 40, according to one embodiment, is a 10 HP pump at 640 rpm. Of course, other sizes, speeds and related parameters are contemplated according to embodiments of the invention.

Figure 9:
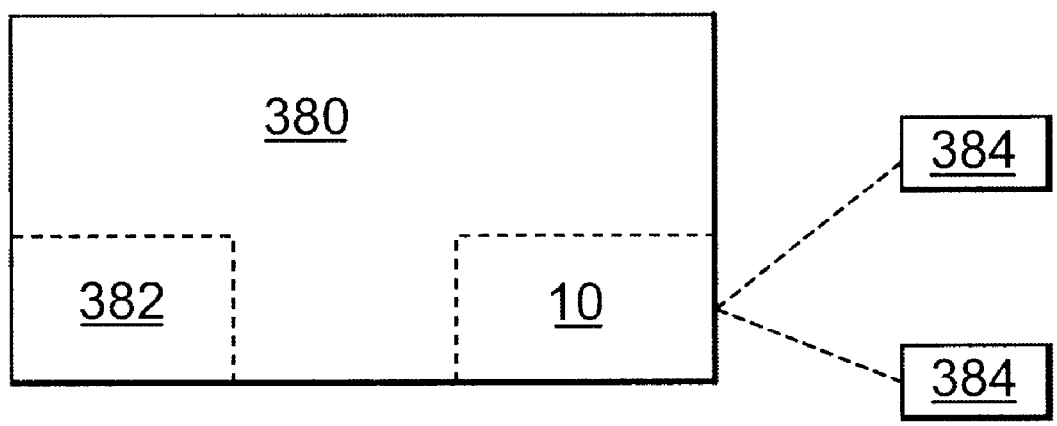
FIG. 9 is a schematic view showing a vehicle and receiving vessels, according to an embodiment of the invention.

FIG. 9 is a schematic illustration of vehicle 380 with engine 382. System 10 is supported on vehicle 380 and discharges first fluid, e.g. propane, to receiving vessels 384 external to system 10.

While embodiments of the invention have been described with reference to particular preferred embodiments, the invention is not limited to the specific examples given. Use with a wide variety of tractors, trailers, and other vehicles and devices and with a wide variety of liquids is contemplated. Various materials can be used according to the invention, e.g. stainless-steel componentry, or any material having strength and durability sufficient to withstand severe operational conditions. Various modifications and changes will occur to those of ordinary skill upon reading this disclosure, and other embodiments and modifications can be made by those skilled in the art without departing from the spirit and scope of the invention.

What is claimed is:

1. A fluid handling system, comprising:
   a supplying vessel for holding a first fluid;
   a discharge flow path in fluid communication with the supplying vessel, the discharge flow path being disposed to receive the first fluid from the supplying vessel for discharge from the system;
   a discharge, in fluid communication with the discharge flow path, for fluid communication with a receiving vessel external to the system, the first fluid being directed by the discharge flow path from the supplying vessel to the receiving vessel via the discharge;
   a return flow path in fluid communication with the discharge flow path and with the supplying vessel, the return flow path being disposed to receive first fluid from the discharge flow path for return to the supplying vessel;
   a heat-exchange flow path, the heat-exchange flow path being disposed to contain a second fluid that is free of fluid communication with the first fluid;
   a pumping mechanism in fluid communication with the discharge flow path and in fluid communication with the heat-exchange flow path, the pumping mechanism being adapted to receive second fluid from the heat-exchange flow path and being actuable by the second fluid to move the first fluid along the discharge flow path; and
   a heat exchanger in fluid communication with the return flow path and the heat-exchange flow path to receive first fluid from the return flow path and second fluid from the heat-exchange flow path to cause thermal transfer between the first fluid and the second fluid.

2. The fluid handling system of claim 1, wherein the second fluid is hydraulic fluid routed to actuate at least one hydraulic mechanism, the heat exchanger cooling the hydraulic fluid such that the hydraulic fluid is maintained at a safe operating temperature without the use of a cooling fan.

3. The fluid handling system of claim 1, wherein the return flow path intersects the discharge flow path at an intersection point downstream from the pumping mechanism.

4. The fluid handling system of claim 3, wherein the first fluid in the discharge flow path is in the form of a liquid at the intersection point; further wherein the first fluid in the return flow path is in the form of a liquid at the intersection point.

5. The fluid handling system of claim 1, wherein the heat-exchange flow path is in fluid communication with a hydraulic mechanism such that the hydraulic mechanism is actuated by the second fluid.

6. The fluid handling system of claim 1, wherein the heat exchanger causes the first fluid to change state between a liquid and a vapor.

7. The fluid handling system of claim 6, wherein the supplying vessel contains a liquid space and a vapor space, further wherein the return flow path returns the first fluid to the vapor space of the supplying vessel as a vapor.

8. The fluid handling system of claim 6, wherein the supplying vessel contains a liquid space and a vapor space, further wherein the return flow path returns the first fluid to the liquid space of the supplying vessel.

9. The fluid handling system of claim 1, wherein the heat exchanger is a liquid-to-liquid heat exchanger.

10. The fluid handling system of claim 1, wherein the heat exchanger is constructed and disposed to cause a temperature change in the second fluid.

11. The fluid handling system of claim 1, wherein the temperature of the first fluid is less than the maximum desired temperature of the second fluid.

12. The fluid handling system of claim 1, further comprising:

a temperature sensor in communication with the heat-exchange flow path for sensing the temperature of the second fluid; and a heat generator in communication with the heat-exchange flow path, the heat generator being constructed and disposed for heating the second fluid in response to an indication from the temperature sensor.

13. The fluid handling system of claim 1, wherein the fluid handling system is disposed on a vehicle comprising an engine.

14. The fluid system of claim 13, wherein the second fluid comprises engine coolant.

15. The fluid handling system of claim 1, wherein the first fluid comprises propane, the supplying vessel comprises a propane tank, the discharge flow path is defined by a discharge line, the return flow path is defined by a return line, and the heat-exchange flow path is defined by a heat-exchange line.

16. The fluid handling system of claim 1, wherein the second fluid comprises hydraulic fluid.

17. The fluid handling system of claim 1, wherein the discharge is for fluid communication with receiving vessels external to the system, the discharge flow path being adapted to direct the first fluid from the supplying vessel to each receiving vessel individually via the discharge.

* * * * *